UNITED STATES PATENT OFFICE.

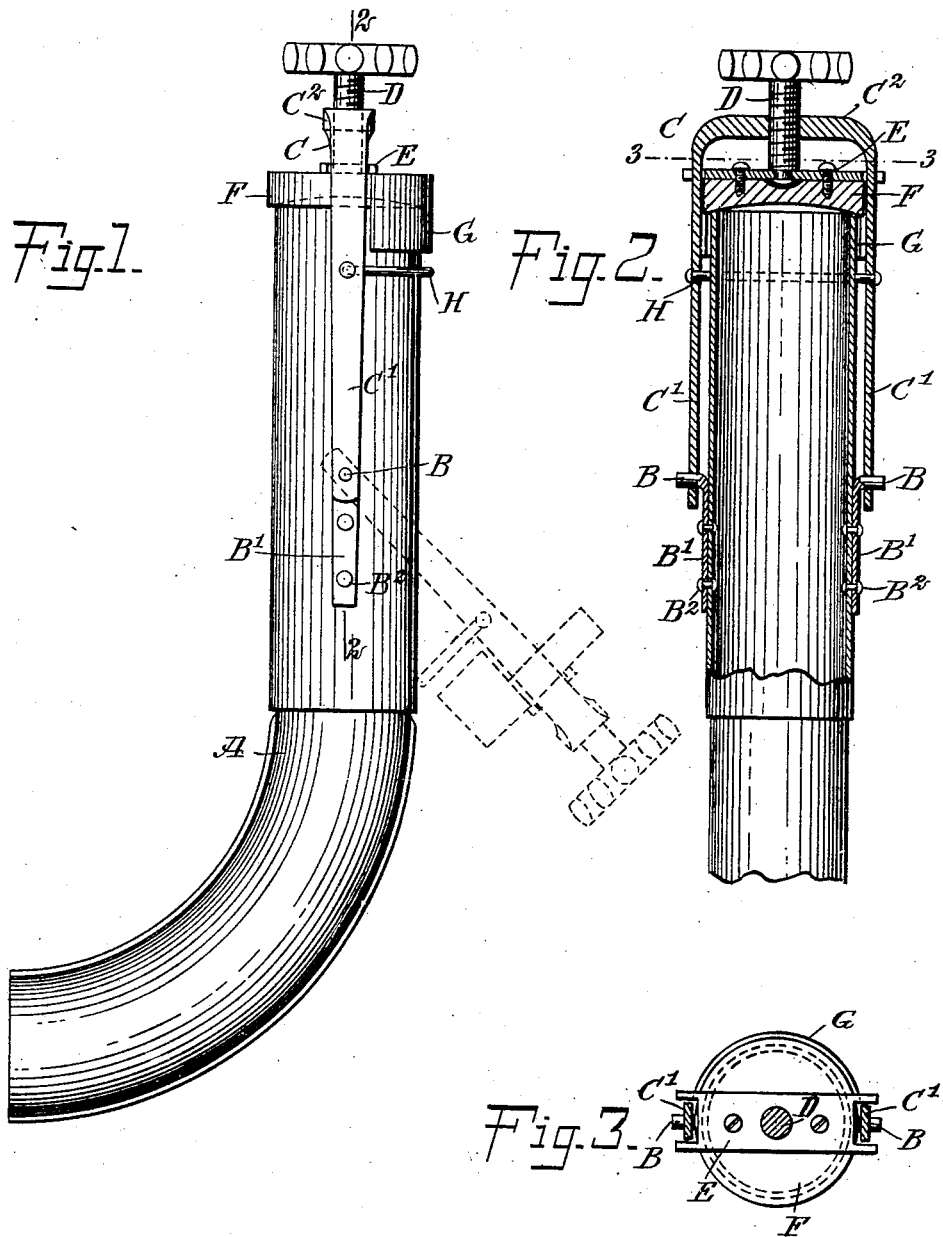

ALFRED ALMONT FISK, OF POMONA, CALIFORNIA.

PIPE-CLOSURE.

No. 862,626.        Specification of Letters Patent.        Patented Aug. 6, 1907.

Application filed July 19, 1906. Serial No. 326,859.

*To all whom it may concern:*

Be it known that I, ALFRED ALMONT FISK, a citizen of the United States, and a resident of Pomona, in the county of Los Angeles and State of California, have invented a new and Improved Pipe-Closure, of which the following is a full, clear, and exact description.

The invention relates to irrigation pipes, stand pipes and the like, and its object is to provide a new and improved pipe closure arranged to permit of conveniently, quickly and securely closing the end of a pipe, and to allow of opening the same for making connection with another pipe whenever it is desired to do so.

The invention consists of novel features and parts and combinations of the same, which will be more fully described hereinafter and then pointed out in the claims.

A practical embodiment of the invention is represented in the accompanying drawing forming a part of this specification, in which similar characters of reference indicate corresponding parts in all the views.

Figure 1 is a side elevation of the improvement; Fig. 2 is a transverse section of the same on the line 2—2 of Fig. 1, and Fig. 3 is a sectional plan view of the same on the line 3—3 of Fig. 2.

On the irrigation pipe, stand pipe or other pipe are arranged trunnions B located diametrically opposite each other and having shanks B' fastened by rivets B² or like devices to the sides of the pipe A a distance from the terminal thereof. The trunnions B are engaged by the side arms C' of a bail having its middle portion C² extending beyond the terminal of the pipe A, and in the said middle portion C² of the bail C screws a screw rod D engaging a cross head E mounted to slide on the side arms C' of the bail C. To the cross head E is secured a wooden disk valve F, having its under side preferably concave, and adapted to be seated on the terminal of the pipe A so as to close the same to prevent the escape of water or other liquid passing through the pipe. One side of the disk valve F is provided with a semicircular depending flange G adapted to engage the corresponding side of the pipe A, and the side arms C' of the bail C are provided with a semicircular guard H likewise adapted to rest against the side of the pipe A to limit the swinging motion of the bail C. Now, when it is desired to connect another pipe to the pipe A, it is only necessary for the operator to unscrew the screw rod D so as to cause the cross head E to slide outwardly on the slide arms C' of the bail C, and as the disk valve is secured to this cross head E, it is evident that the disk valve moves with the cross head and away from the terminal of the pipe A. When this takes place the bail C can be swung downward into the position shown in dotted lines in Fig. 1, so that the pipe A is open and completely free at its terminal, to permit of connecting another pipe to the terminal of the pipe A.

A flange G serves to prevent water flowing out of the pipe and of squirting onto the operator when placing the valve F in a closed position, that is by swinging the bail upward, to bring the disk valve F over the terminal of the pipe A, and to then move the disk valve F downward by screwing the screw rod A inward until the under face of the disk valve F is seated on the end of the pipe A.

The device is very simple and durable in construction and can be readily manipulated for closing the end of the pipe or for opening the same whenever it is desired to connect another pipe with it.

Having thus described my invention, I claim as new and desire to secure by Letters Patent:

1. A closure for irrigation pipes, stand pipes, and like pipes, comprising a bail hinged to the pipe, a screw rod screwing in the bail, and a valve held on the said screw rod and adapted to be seated on the end of the said pipe said valve having a semi-circular depending flange at one of the sides thereof.

2. A closure for irrigation pipes, stand pipes and like pipes, comprising a bail hinged to the pipe, a screw rod screwing in the bail, a wooden disk valve having a concave face and held on and running bodily with the said screw rod, the said concave face being adapted to be seated on the end of the said pipe, and a semicircular flange depending from the said disk valve.

3. A closure for pipes, comprising a bail hinged to the pipe, a rod threaded through the bail, a valve held on the said rod and adapted to be seated on the end of the said pipe, said valve having a semi-circular depending flange at one of the sides thereof, and a semi-circular guard connected with the arms of the bail and adapted to engage the pipe when the said valve is swung into place.

In testimony whereof I have signed my name to this specification in the presence of two subscribing witnesses.

ALFRED ALMONT FISK.

Witnesses:
    J. C. BEALE,
    J. E. McCOMAS.